US012640011B2

(12) United States Patent
Soong

(10) Patent No.: US 12,640,011 B2
(45) **Date of Patent: *May 26, 2026**

(54) GAMING MACHINE AND METHOD WITH PERSISTENCE FEATURE

(71) Applicant: LNW Gaming, Inc., Las Vegas, NV (US)

(72) Inventor: Kenneth Shawn Soong, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 221 days.

This patent is subject to a terminal disclaimer.

(21) Appl. No.: 18/648,923

(22) Filed: Apr. 29, 2024

(65) Prior Publication Data

US 2024/0273976 A1 Aug. 15, 2024

Related U.S. Application Data

(63) Continuation of application No. 17/850,506, filed on Jun. 27, 2022, now Pat. No. 12,002,329, which is a (Continued)

(51) Int. Cl.
*G07F 17/32* (2006.01)
*G06Q 50/34* (2012.01)

(52) U.S. Cl.
CPC ......... *G07F 17/3267* (2013.01); *G06Q 50/34* (2013.01); *G07F 17/3211* (2013.01)

(58) Field of Classification Search
None
See application file for complete search history.

(56) References Cited

U.S. PATENT DOCUMENTS 3,733,075 A 5/1973 Burnside et al.
5,342,047 A 8/1994 Heidel et al.
(Continued)

FOREIGN PATENT DOCUMENTS

AU 2015210489 A1 2/2016
GB 2097160 B 5/1984
(Continued)

OTHER PUBLICATIONS

Zodiac Lion Class III Slot Game; IGT; Casino Journal, Mar. 5, 2020.
(Continued)

*Primary Examiner* — Ronald Laneau

(57) ABSTRACT

A gaming system comprises a gaming machine and game-logic circuitry. The gaming machine includes an electronic display device configured to display an array of symbol positions. The game-logic circuitry is configured to perform the operations of: spinning and stopping symbol-bearing reels to land one or more first value-bearing symbols borne by the reels in the array; animating the array to tag the symbol positions in which the first value-bearing symbols land; again spinning and stopping the symbol-bearing reels to land a second value-bearing symbol borne by the reels in one of the tagged symbol positions; awarding an award based on the value borne by the second value-bearing symbol; and animating the array to untag the one of the tagged symbol positions and any other ones of the tagged symbol positions that are in a cluster with the one of the tagged symbol positions.

18 Claims, 8 Drawing Sheets

Related U.S. Application Data continuation of application No. 17/184,891, filed on Feb. 25, 2021, now abandoned.

(60) Provisional application No. 63/027,417, filed on May 20, 2020.

(56) References Cited

U.S. PATENT DOCUMENTS

| | | | |
|---|---|---|---|
| 5,356,140 | A | 10/1994 | Dabrowski et al. |
| 5,393,061 | A | 2/1995 | Manship et al. |
| 5,704,835 | A | 1/1998 | Dietz |
| 5,833,537 | A | 11/1998 | Barrie |
| 5,951,397 | A | 9/1999 | Dickinson |
| 6,027,115 | A | 2/2000 | Griswold et al. |
| 6,056,642 | A | 5/2000 | Bennett |
| 6,089,977 | A | 7/2000 | Bennett |
| 6,224,482 | B1 | 5/2001 | Bennett |
| 6,251,013 | B1 | 6/2001 | Bennett |
| 6,270,411 | B1 | 8/2001 | Gura et al. |
| 6,290,600 | B1 | 9/2001 | Glasson |
| 6,517,432 | B1 | 2/2003 | Jaffe |
| 6,551,187 | B1 | 4/2003 | Jaffe |
| 6,561,900 | B1 | 5/2003 | Baerlocher et al. |
| 6,641,477 | B1 | 11/2003 | Dietz |
| 6,657,923 | B2 | 12/2003 | Laughlin |
| 6,731,313 | B1 | 5/2004 | Kaminkow |
| 6,786,818 | B1 | 9/2004 | Rothschild et al. |
| 6,837,790 | B1 | 1/2005 | Kaminkow |
| 6,910,962 | B2 | 6/2005 | Marks et al. |
| 7,018,293 | B2 | 3/2006 | Brown et al. |
| 7,029,396 | B2 | 4/2006 | Jaffe et al. |
| 7,121,945 | B2 | 10/2006 | Suganuma et al. |
| 7,179,169 | B2 | 2/2007 | Beaulieu et al. |
| 7,252,591 | B2 | 8/2007 | Van Asdale |
| 7,458,890 | B2 | 12/2008 | Loose et al. |
| 7,503,847 | B2 | 3/2009 | Baerlocher |
| 7,553,231 | B2 | 6/2009 | Rodgers et al. |
| 7,604,538 | B2 | 10/2009 | Pacey |
| 7,980,936 | B2 | 7/2011 | Mead |
| 8,083,581 | B2 | 12/2011 | Marks et al. |
| 8,105,151 | B2 | 1/2012 | Caputo et al. |
| 8,162,741 | B2 | 4/2012 | Wadleigh et al. |
| 8,192,275 | B2 | 6/2012 | Aoki et al. |
| 8,287,357 | B2 | 10/2012 | Evans |
| 8,323,091 | B2 | 12/2012 | Frank et al. |
| 8,357,041 | B1 | 1/2013 | Saunders |
| 8,360,851 | B2 | 1/2013 | Aoki et al. |
| 8,366,538 | B1 | 2/2013 | Saunders et al. |
| 8,371,930 | B1 | 2/2013 | Saunders et al. |
| 8,414,380 | B2 | 4/2013 | Saunders et al. |
| 8,465,358 | B2 | 6/2013 | Kemper |
| 8,496,522 | B2 | 7/2013 | Caputo et al. |
| 8,512,138 | B2 | 8/2013 | Saunders |
| 8,523,659 | B2 | 9/2013 | Evans |
| 8,574,059 | B2 | 11/2013 | Rodgers et al. |
| 8,608,545 | B2 | 12/2013 | Arora et al. |
| 8,662,986 | B2 | 3/2014 | Rodgers et al. |
| 8,690,660 | B2 | 4/2014 | Saunders et al. |
| 8,696,434 | B2 | 4/2014 | Tsukahara |
| 8,790,169 | B2 | 7/2014 | Saunders |
| 8,851,974 | B2 | 10/2014 | Caputo et al. |
| 8,870,642 | B2 | 10/2014 | Leupp et al. |
| 8,882,578 | B2 | 11/2014 | Saunders |
| 8,961,291 | B2 | 2/2015 | Dias Pires et al. |
| 9,005,022 | B2 | 4/2015 | Saunders |
| 9,165,433 | B2 | 10/2015 | Caputo |
| 9,202,345 | B2 | 12/2015 | Zoltewicz et al. |
| 9,230,410 | B2 | 1/2016 | Saunders et al. |
| 9,245,421 | B2 | 1/2016 | Saunders et al. |
| 9,251,667 | B2 | 2/2016 | Marks et al. |
| 9,257,017 | B2 | 2/2016 | Saunders et al. |
| 9,262,895 | B2 | 2/2016 | Rodgers et al. |
| 9,275,524 | B2 | 3/2016 | Nicely |
| 9,299,224 | B2 | 3/2016 | Leupp |
| 9,311,781 | B2 | 4/2016 | Edwards |
| 9,349,251 | B2 | 5/2016 | Caputo et al. |
| 9,355,528 | B2 | 5/2016 | Nicely |
| 9,418,521 | B1 | 8/2016 | Henrick et al. |
| 9,424,720 | B2 | 8/2016 | Suda |
| 9,430,900 | B2 | 8/2016 | Zoltewicz et al. |
| 9,466,169 | B2 | 10/2016 | Basallo et al. |
| 9,633,506 | B2 | 4/2017 | Basallo et al. |
| 9,928,691 | B2 | 3/2018 | Olive |
| 10,013,855 | B2 | 7/2018 | Nakamura |
| 10,037,651 | B2 | 7/2018 | You et al. |
| 10,043,350 | B2 | 8/2018 | Gomez et al. |
| 10,204,473 | B2 | 2/2019 | Lenger |
| 10,339,761 | B2 | 7/2019 | Olive |
| 10,366,575 | B2 | 7/2019 | Visser |
| 10,388,112 | B2 | 8/2019 | You et al. |
| 10,417,877 | B2 | 9/2019 | Gomez et al. |
| 10,475,294 | B2 | 11/2019 | Gomez et al. |
| 10,643,431 | B2 | 5/2020 | Chesworth et al. |
| 10,672,220 | B2 | 6/2020 | Lenger |
| 10,706,664 | B2 | 7/2020 | Boese et al. |
| 10,769,888 | B2 | 9/2020 | You et al. |
| 11,625,982 | B2 | 4/2023 | La Guardia et al. |
| 11,804,104 | B2 | 10/2023 | Kearns |
| 2002/0119818 | A1 | 8/2002 | Savio et al. |
| 2003/0035346 | A1 | 2/2003 | Laughlin |
| 2003/0064796 | A1 | 4/2003 | Glavich et al. |
| 2003/0130034 | A1 | 7/2003 | Suganuma et al. |
| 2003/0157980 | A1 | 8/2003 | Loose et al. |
| 2003/0216165 | A1 | 11/2003 | Singer et al. |
| 2004/0023714 | A1 | 2/2004 | Asdale |
| 2004/0043815 | A1 | 3/2004 | Kaminkow |
| 2004/0137982 | A1 | 7/2004 | Cuddy et al. |
| 2004/0171417 | A1 | 9/2004 | Beaulieu et al. |
| 2006/0189369 | A1 | 8/2006 | Taylor |
| 2007/0060248 | A1 | 3/2007 | Rodgers et al. |
| 2007/0060275 | A1 | 3/2007 | Gilmore et al. |
| 2007/0129135 | A1 | 6/2007 | Marks et al. |
| 2008/0003278 | A1 | 1/2008 | Mondelo |
| 2008/0004532 | A1 | 1/2008 | Rubey et al. |
| 2008/0032784 | A1 | 2/2008 | Englman |
| 2008/0045298 | A1 | 2/2008 | Yoshizawa |
| 2008/0045320 | A1 | 2/2008 | Kato |
| 2008/0108431 | A1 | 5/2008 | Cuddy et al. |
| 2009/0227356 | A1 | 9/2009 | Moroney |
| 2009/0239634 | A1 | 9/2009 | Nguyen |
| 2009/0291741 | A1 | 11/2009 | Schofield |
| 2010/0075737 | A1 | 3/2010 | Bluemel |
| 2010/0167815 | A1 | 7/2010 | Gagner et al. |
| 2010/0234092 | A1 | 9/2010 | Gomez et al. |
| 2010/0304832 | A1 | 12/2010 | Kup-Ferroth |
| 2012/0122532 | A1 | 5/2012 | Berman et al. |
| 2012/0178517 | A1 | 7/2012 | Montenegro et al. |
| 2014/0014186 | A1 | 1/2014 | Bhattacharya et al. |
| 2014/0066170 | A1 | 3/2014 | Aoki et al. |
| 2014/0141860 | A1 | 5/2014 | Meyer |
| 2014/0179396 | A1 | 6/2014 | Aoki et al. |
| 2014/0274292 | A1 | 9/2014 | Suda |
| 2014/0323198 | A1 | 10/2014 | Tuck |
| 2015/0031437 | A1 | 1/2015 | Gomez et al. |
| 2015/0170462 | A1 | 6/2015 | Berman et al. |
| 2015/0269809 | A1 | 9/2015 | Smith |
| 2015/0287269 | A1 | 10/2015 | Berman |
| 2015/0356833 | A1 | 12/2015 | Aoki et al. |
| 2016/0042597 | A1 | 2/2016 | Olive |
| 2017/0154498 | A1 | 6/2017 | Olive |
| 2018/0268655 | A1 | 9/2018 | Olive |
| 2018/0268659 | A1 | 9/2018 | Chesworth et al. |
| 2019/0019371 | A1 | 1/2019 | Bolling, Jr. |
| 2019/0236905 | A1 | 8/2019 | Washington et al. |
| 2019/0340880 | A1 | 11/2019 | You et al. |
| 2020/0090467 | A1 | 3/2020 | Marks et al. |
| 2020/0279457 | A1 | 9/2020 | Chesworth et al. |
| 2020/0364982 | A1 | 11/2020 | You et al. |
| 2021/0056810 | A1 | 2/2021 | La Guardia et al. |
| 2021/0366236 | A1* | 11/2021 | Soong ................. G07F 17/3211 |
| 2023/0103663 | A1* | 4/2023 | Milosevich ......... G07F 17/3213 463/20 |
| 2023/0267807 | A1* | 8/2023 | Tsombanidis ....... G07F 17/3244 463/20 |

(56) References Cited

U.S. PATENT DOCUMENTS

| | | | |
|---|---|---|---|
| 2023/0327894 A1 | 10/2023 | Lee | |
| 2023/0368615 A1 | 11/2023 | Tsombanidis et al. | |
| 2023/0410609 A1 | 12/2023 | Andersson et al. | |
| 2023/0419771 A1 | 12/2023 | Milosevich et al. | |
| 2025/0104536 A1* | 3/2025 | Milosevich | G07F 17/3244 |

FOREIGN PATENT DOCUMENTS

| | | |
|---|---|---|
| GB | 2144568 B | 9/1985 |
| GB | 2251112 A | 6/1992 |

OTHER PUBLICATIONS

Zodiac Lion Slot Machine Snapshots from YouTube Video posted Aug. 15, 2019.

* cited by examiner

GAMING MACHINE AND METHOD WITH PERSISTENCE FEATURE

CROSS REFERENCE TO RELATED APPLICATIONS

This application is a continuation of U.S. application Ser. No. 17/850,506, filed Jun. 27, 2022, which is a continuation of U.S. application Ser. No. 17/184,891, filed Feb. 25, 2021, which claims the benefit of U.S. Provisional Application No. 63/027,417, filed May 20, 2020, the contents of each of the foregoing being incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2020, LNW Gaming, Inc.

FIELD OF THE INVENTION

The present invention relates to a technological improvement to gaming systems, apparatus, and methods and, more particularly, to new and improved animations in connection with a symbol array persistence feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system and a method of operating a gaming system. The gaming system comprises a gaming machine and game-logic circuitry. The gaming machine includes an electronic display device configured to display an array of symbol positions. The game-logic circuitry is configured to perform the operations of: spinning and stopping symbol-bearing reels to land one or more first value-bearing symbols borne by the reels in the array; animating the array to tag the symbol positions in which the first value-bearing symbols land; again spinning and stopping the symbol-bearing reels to land a second value-bearing symbol borne by the reels in one of the tagged symbol positions; awarding an award based on the value borne by the second value-bearing symbol; and animating the array to untag the one of the tagged symbol positions and any other ones of the tagged symbol positions that are in a cluster with the one of the tagged symbol positions.

Additional aspects of the invention will be apparent to those of ordinary skill in the art in view of the detailed description of various embodiments, which is made with reference to the drawings, a brief description of which is provided below.

Figure 1:
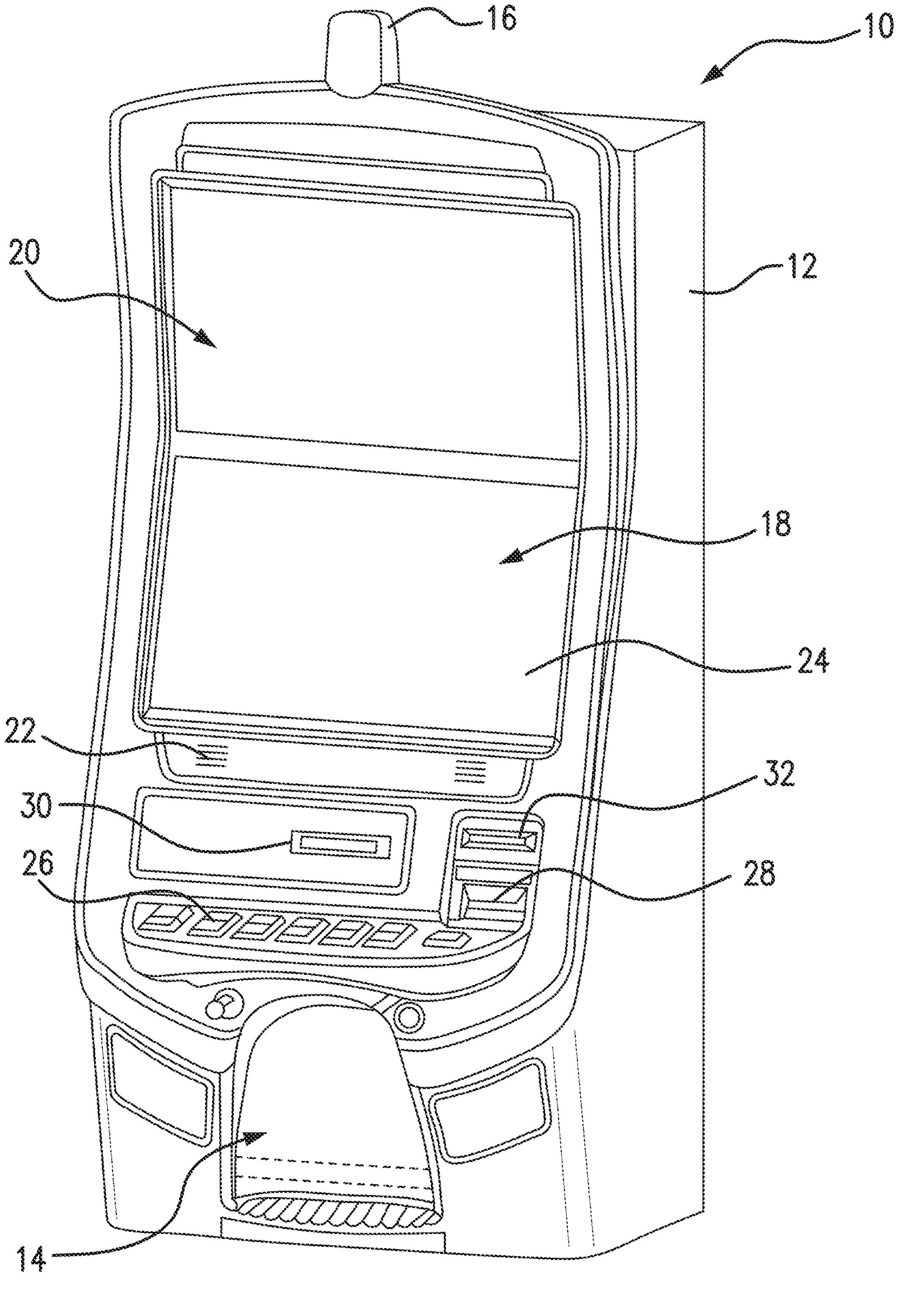
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
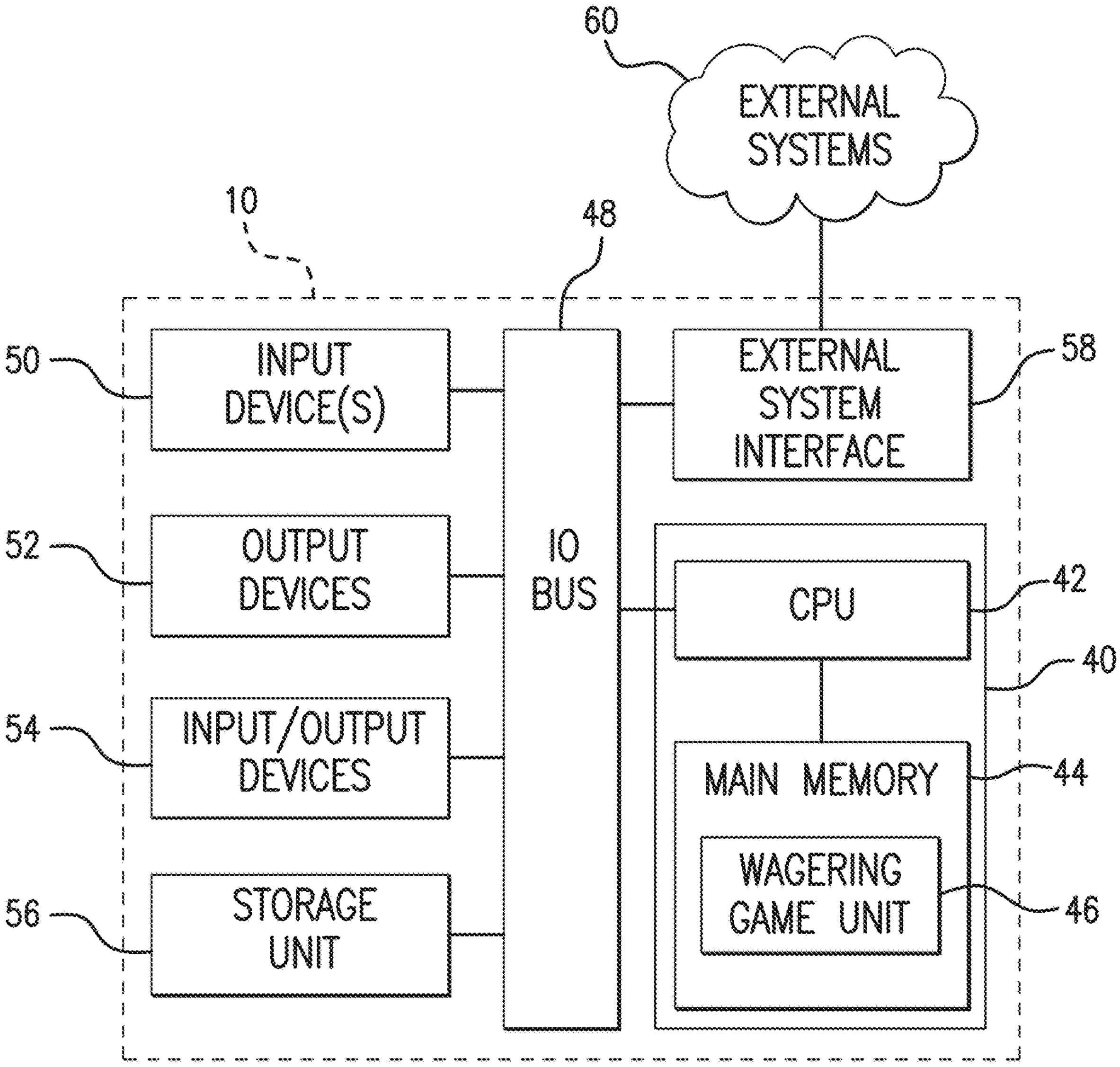
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD.

By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
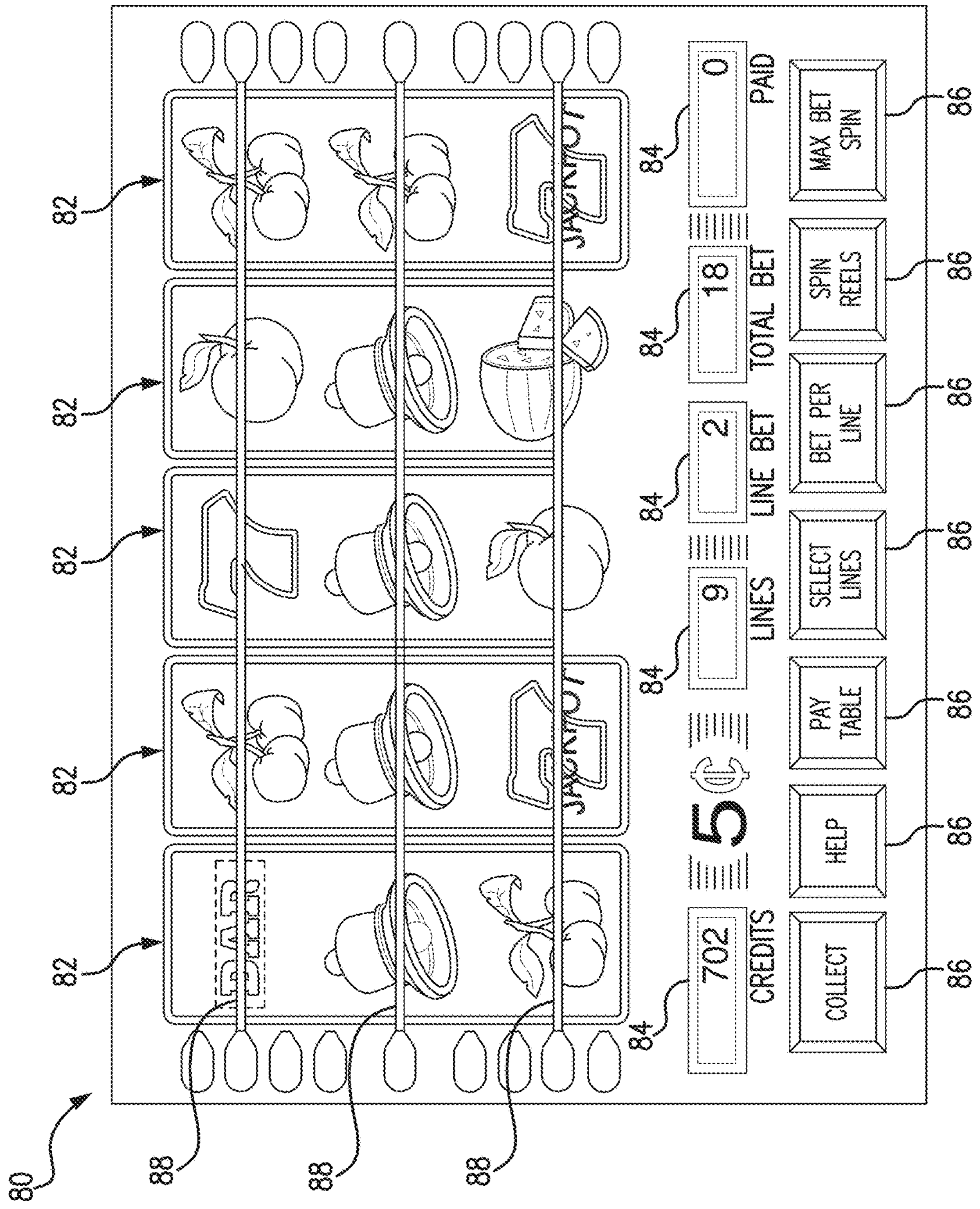
FIG. 3 is an image of an exemplary basic-game screen of a wagering game displayed on a gaming machine, according to an embodiment of the present invention.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager drawn on or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus games in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus games based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 4:
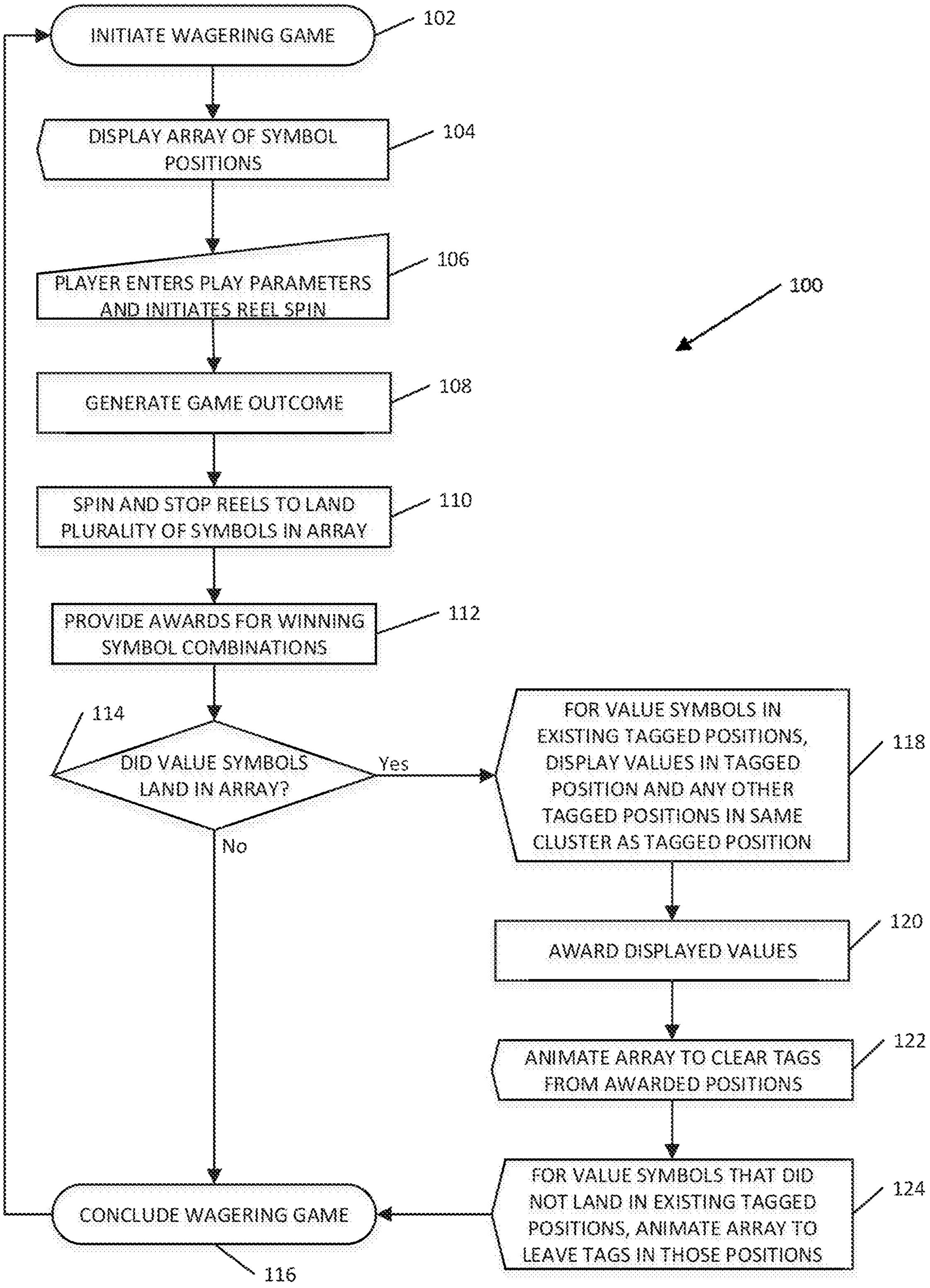
FIG. 4 is a flowchart for an algorithm that corresponds to instructions executed by a controller in accord with at least some aspects of the disclosed concepts.

Referring now to FIG. 4, there is shown a flowchart representing one data processing method 100 corresponding to at least some instructions stored and executed by the game-logic circuitry 40 in FIG. 2 to perform operations embodying the present invention.

At step 102, the game-logic circuitry initiates a wagering game. At step 104, the game-logic circuitry directs a display of the gaming machine to display an array of symbol positions. At step 106, a player enters play parameters such as a wager amount to be drawn from a credit balance (deducted from a credit meter) and number of lines or ways along which winning symbol combinations must appear. To initiate a spin of the reels, the player may press a "Spin Reels" or "Max Bet" key on a button panel or touch screen. At step 108, in response to the player initiating the reel spin, the game-logic circuitry generates a random game outcome. At step 110, the game-logic circuitry spins and stops the reels to land a plurality of symbols in the displayed array according to the selected game outcome. At step 112, the game-logic circuitry provides awards for any winning symbol combinations (e.g., line pays and scatter pays) in the array.

At step 114, the game-logic circuitry determines whether or not the landed plurality of symbols include value-bearing symbols.

If the landed plurality of symbols does not include value-bearing symbols at step 114, the game-logic circuitry concludes the current game cycle at step 116.

If, however, the landed plurality of symbols include value-bearing symbols at step 114, flow proceeds to step 118. For any value-bearing symbols that landed in existing tagged symbol positions in the array (i.e., a symbol position that was tagged in a prior game cycle), the game-logic circuitry directs the display to display the value borne by the value-bearing symbol in the tagged symbol position and any other tagged symbol positions in the same cluster as the tagged position. A cluster is a set of tagged symbol positions that are adjacent to each other such that each tagged symbol position in the cluster is horizontally, vertically, or diagonally adjacent to at least one other tagged symbol position in the cluster. If a plurality of value-bearing symbols landed in the same cluster, the game-logic circuitry directs the display to display the first value borne by a first value-bearing symbol of the plurality in its tagged symbol position, to display the second value borne by a second value-bearing symbol of the plurality in its tagged symbol position, and so on, and then to display a value derived from the first, second, etc. values in any other tagged symbol positions in the cluster that were not populated by the landed value-bearing symbols. The derived value applied to these unpopulated, tagged symbol positions may, for example, be the sum of the first, second, etc. values. At steps 120 and 122, the game-logic circuitry awards the displayed values and animates the array to remove or clear or untag the tagged positions in the cluster.

After clearing the tags from the awarded symbol positions, flow proceed to step 124. At step 124, for each value-bearing symbols that did not land in an existing tagged position in the array (i.e., a symbol position that was tagged in a prior game cycle), the game-logic circuitry animates the array to visually tag (i.e., leave behind tags) the symbol position in which that value-bearing symbol landed. The game-logic circuitry may, for example, tag a symbol position by applying a border, color change, background change, watermark, or other distinguishing characteristic to that position to distinguish it from untagged positions.

The game logic circuitry then concludes the current game cycle at step 116.

Figure 5A:
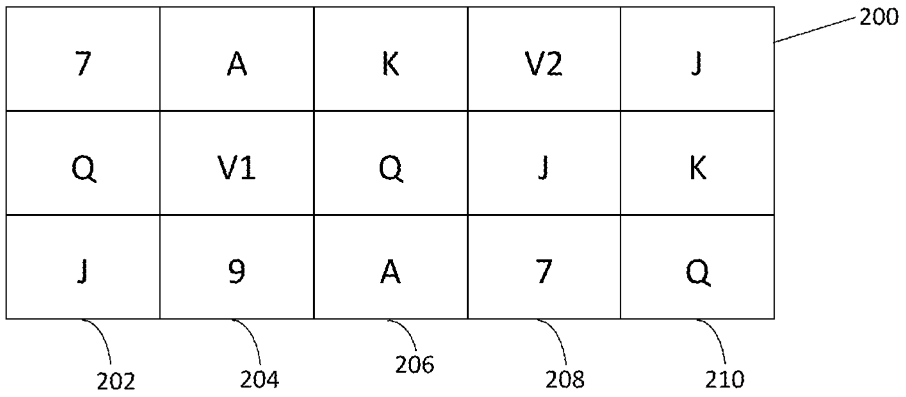
FIGS. 5A-5B, 6A-6B, 7A-7C, and 8A-8C are representations of a series of game cycles of a wagering game displayed on a gaming machine, according to an embodiment of the present invention.
Figure 5B:
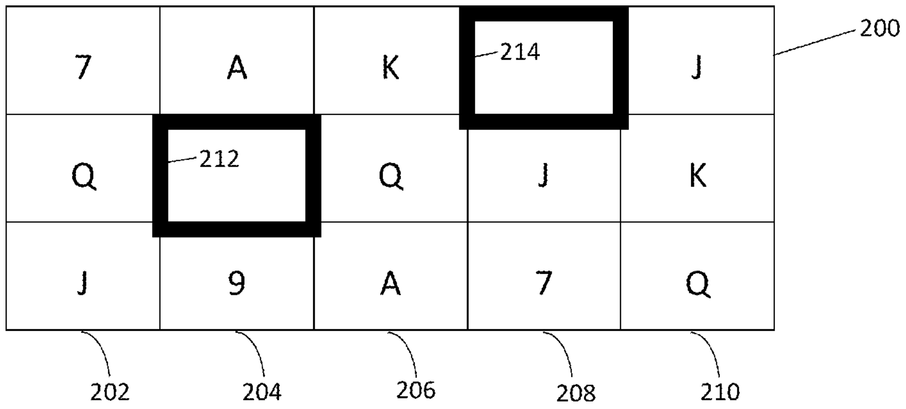
Figure 6A:
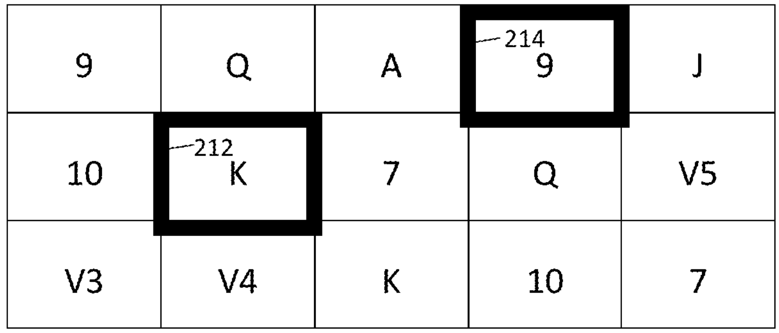
Figure 6B:
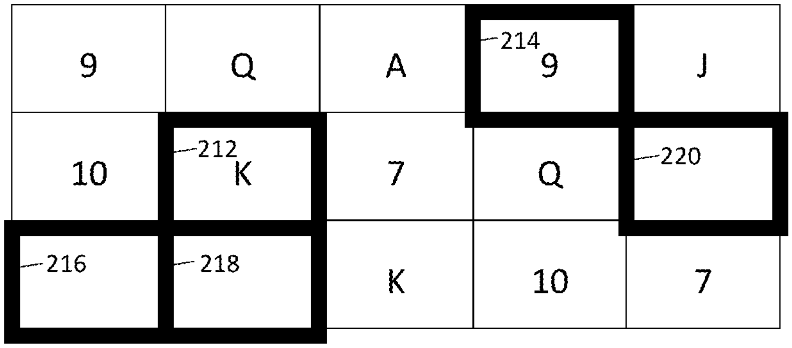
Figure 7A:
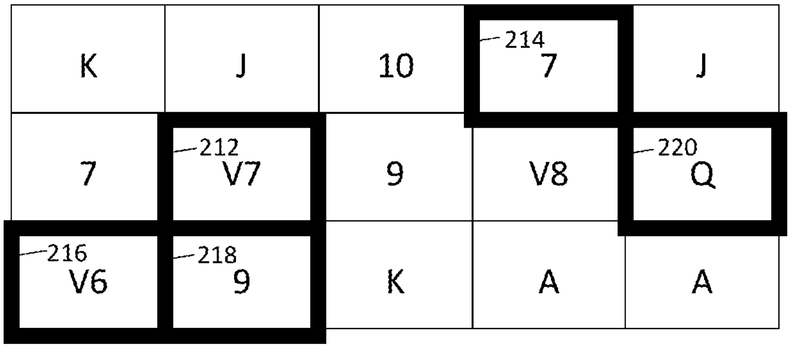
Figure 7B:
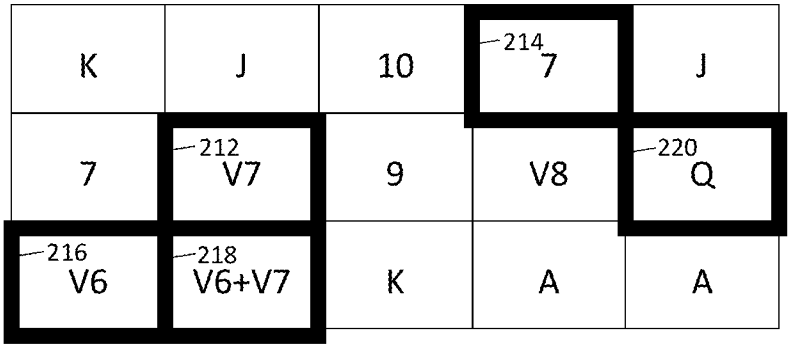
Figure 7C:
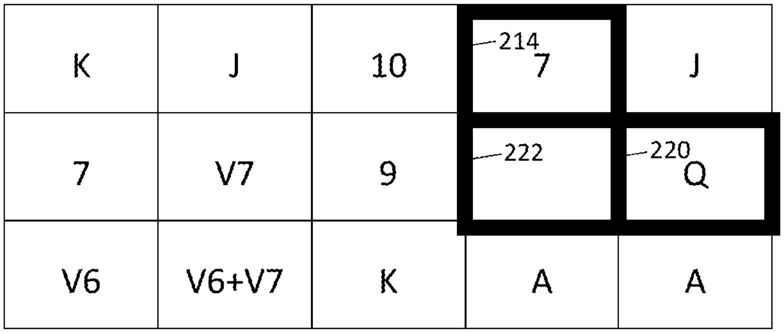
Figure 8A:
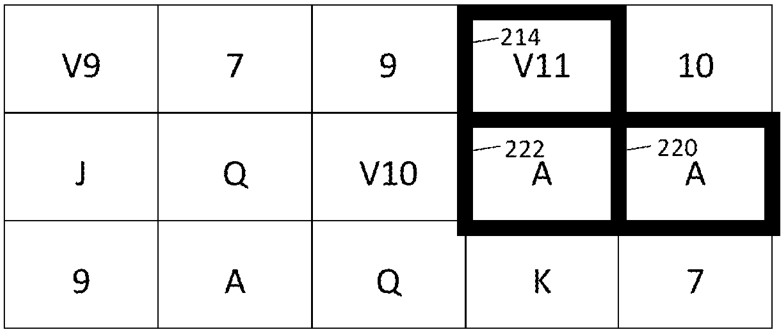
Figure 8B:
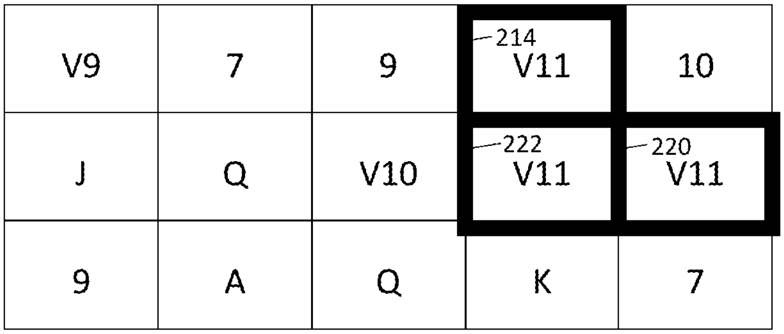
Figure 8C:
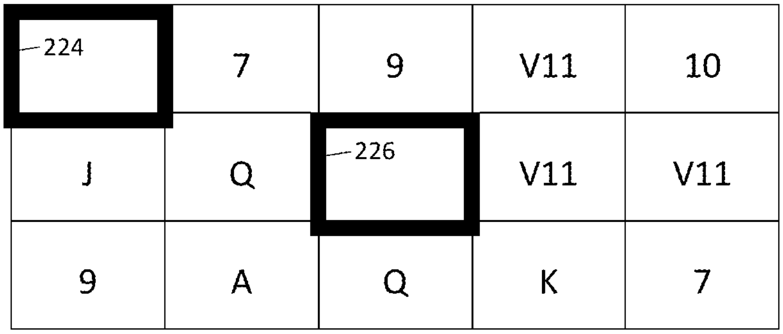

FIGS. 5A-5B through 8A-8C illustrate an example of base game play under control of the game-logic circuitry. Each set of figures represents a respective base game cycle. Specifically, FIGS. 5A-5B represents a first game cycle; FIGS. 6A-6B represents a second game cycle succeeding the first cycle; FIGS. 7A-7C represents a third game cycle succeeding the second cycle; and FIGS. 8A-8C represents a fourth game cycle succeeding the third cycle. In each game cycle, a plurality of symbol-bearing reels are spun and stopped to land a plurality of symbols in a symbol array 200. The illustrated array 200 has fifteen symbol positions arranged in three rows and five columns 202, 204, 206, 208, and 210. Each column is associated with a respective reel such that each stopped reel presents three symbols. Alternatively, each symbol position may be associated with a respective independent reel such that each stopped reel presents a single symbol. The array may have more or less rows and/or columns. The number of symbol positions in each column may vary from each other. For example, the first, third, and fifth columns 202, 206, and 210 may have three symbol positions vertically aligned with each other, while the second and fourth columns 204 and 208 have four symbol positions that are vertically aligned with each other but vertically offset from the other columns by one-half symbol position.

Referring to the first game cycle of FIGS. 5A-5B, the reels are spun and stopped to land a plurality of symbols in the array 200. As shown in FIG. 5A, the landed plurality of symbols include two value-bearing symbols V1 and V2. Each value-bearing symbol may be represented by a coin or chip bearing a respective credit value such as 100, 200, 300, 400, or 500 credits. Different value-bearing symbols, e.g., V1 and V2, may bear the same or different credit values. As shown in FIG. 5B, because the value-bearing symbols V1 and V2 did not land in previously tagged symbol positions, the array 200 is animated to apply visual tags 212 and 214 (in the form of thicker borders) to the symbol positions in which the symbols V1 and V2 landed. These tags 212 and 214 persist to the second game cycle in FIGS. 6A-6B.

Referring to the second game cycle of FIGS. 6A-6B, the reels are spun and stopped to land another plurality of symbols in the array 200. As shown in FIG. 6A, the landed plurality of symbols include three value-bearing symbols V3, V4, and V5. As shown in FIG. 6B, because the value-bearing symbols V3, V4, and V5 did not land in previously tagged symbol positions, the array 200 is animated to apply visual tags 216, 218, and 220 to the symbol positions in which the symbols V3, V4, and V5 landed. The tags 212, 216, and 218 form a first cluster 212/216/218 of tagged positions that are adjacent to each other, while the tags 214 and 220 form a second cluster 214/220 of tagged positions that are adjacent to each other. The tags 212, 214, 216, 218, and 220 persist to the third game cycle in FIGS. 7A-7C.

Referring to the third game cycle of FIGS. 7A-7C, the reels are spun and stopped to land another plurality of symbols in the array 200. As shown in FIG. 7A, the landed plurality of symbols include three value-bearing symbols V6, V7, and V8. As shown in FIG. 7B, because the value-bearing symbols V6 and V7 landed in respective previously tagged positions 216 and 212 in the same cluster 212/216/218, the value borne by symbol V6 is displayed in its symbol position 216, the value borne by symbol V7 is displayed in its symbol position 212, and a value derived from values of V6 and V7 is displayed in the third symbol position 218 in the cluster 212/216/218. The derived value may, for example, be the sum of V6 and V7 (as shown in FIG. 7B), the multiplication of V6 and V7, the average of V6 and V7, the lower value of V6 and V7, the higher value of V6 and V7, a random value, etc. The displayed values are awarded to the player. As shown in FIG. 7C, the array is then animated to remove or clear the tags 212, 216, and 218 in the cluster 212/216/218. Because the value-bearing symbol V8 did not land in a previously tagged symbol position, the array 200 is animated to apply (leave behind) a visual tag 222 to the symbol position in which the symbol V8 landed. The cluster 214/220 has now been expanded to include the tag 222. The tags 214, 220, and 222 in the expanded cluster 214/220/222 persist to the fourth game cycle in FIGS. 8A-8C.

Referring to the fourth game cycle of FIGS. 8A-8C, the reels are spun and stopped to land another plurality of symbols in the array 200. As shown in FIG. 8A, the landed plurality of symbols include three value-bearing symbols V9, V10, and V11. As shown in FIG. 8B, because a single value-bearing symbol V11 landed in a previously tagged position 214 in the cluster 214/220/222, the value borne by symbol V11 is displayed in all three symbol positions in the cluster 214/220/220. Alternatively, a random value may be displayed in the tagged positions 220 and 222 not occupied by symbol V11. The displayed values are awarded to the player. The array is then animated to remove or clear the tags 214, 220, and 222 in the cluster 214/220/222. As shown in FIG. 8C, because the value-bearing symbols V9 and V10 did not land in previously tagged symbol positions, the array 200 is animated to apply (leave behind) visual tags 224 and 226 to the symbol positions in which the symbols V9 and V10 landed. The tags 224 and 226 persist to the next game cycle (not shown).

In each game cycle, prior to or after providing any awards for landed value-bearing symbols, the player is awarded for any winning symbol combinations (e.g., line pays and scatter pays) that may appear in the array 200 (e.g., in FIGS. 5A, 6A, 7A, and 8A). And each game cycle may trigger bonus features as described herein. Although not illustrated in the figures, if a value-bearing symbol lands in a previously tagged symbol position that is not part of a cluster of multiple tagged symbol positions, the player is awarded the value borne by that value-bearing symbol, and the tag is removed or cleared from that symbol position.

In one embodiment, the tags "time out" and clear after a predetermined number of game cycles or other triggering event (e.g., cash out, bonus game trigger, etc.), even if the tagged symbol positions have not yielded an award by virtue of a value-bearing symbol landing in the same cluster. The tags may carry over from the basic game into a free game bonus triggered during play of the basic game. The free game bonus may operate like the basic game (but without requiring a wager in each game cycle), and any tags remaining at the conclusion of the free game bonus may carry back from the free game bonus into the basic game. In addition to being left behind by value-bearing symbols, tags may be randomly added to untagged symbol positions in the array.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the gaming machine including a gaming cabinet, an electronic display device, and game-logic circuitry secured within a locked box inside the gaming cabinet, the game-logic circuitry including memory storing programming for a random number generator (RNG) and a wagering game that determines game outcomes, the method comprising the operations of:

prior to executing the wagering game, executing an authentication program on the gaming machine to authenticate at least the RNG programming and the wagering-game programming that determines games outcomes, wherein executing the authentication program comprises generating a live authentication code derived from contents of the memory and comparing the live authentication code to a trusted code stored in the memory, and permitting execution of the RNG programming and the wagering-game programming only upon a match;

displaying, on the electronic display device, a plurality of symbol-bearing reels and an array of symbol positions;

conducting, by the game logic circuitry, a first spin including:

spinning and stopping the symbol-bearing reels using the RNG to randomly determine an outcome that controls the spinning and stopping of the symbol-bearing reels to land one or more first value-bearing symbols borne by the reels in the array; and animating the array on the electronic display device to tag the symbol positions in which the first value-bearing symbols land; and conducting, by the game-logic circuitry, a second spin subsequent to the first spin, the second spin including:

again spinning and stopping the symbol-bearing reels using the RNG to randomly determine an outcome that controls the spinning and stopping of the symbol-bearing reels to land (i) a second value-bearing symbol borne by the reels in one of the tagged symbol positions, and (ii) a third value-bearing symbol borne by the reels in another one of the tagged symbol positions that is in a cluster with the one of the tagged symbol positions;

animating the array on the electronic display device to display (i) a first value borne by the second value-bearing symbol in the one of the tagged symbol positions, (ii) a second value borne by the third value-bearing symbol in the another one of the tagged symbol positions, and (iii) a third value derived from the first and second values in any other ones of the tagged symbol positions in the cluster, presenting, on the electronic display device, an award based on the first, second, and third values; and animating the array on the electronic display device to untag the tagged symbol positions in the cluster.

2. The method of claim 1, wherein the operation of animating the array to tag the symbol positions in which the first value-bearing symbols land includes applying a border, color change, background change, watermark, or other distinguishing characteristic to the symbol positions.

3. The method of claim 1, wherein the third value is equal to the sum of the first and second values.

4. The method of claim 1, wherein the tagged symbol positions in the cluster are adjacent to each other such that each tagged symbol position in the cluster is adjacent to at least one other tagged symbol position in the cluster.

5. The method of claim 1, further comprising the operations of:

detecting, via a value input device, a physical item associated with a monetary value that establishes a credit balance; and receiving, via at least one of one or more electronic input devices, a cash out input that initiates a payout from the credit balance.

6. The method of claim 5, further comprising the operation of:

receiving, via at least one of the one or more electronic input devices, a wager input that initiates the first spin.

7. A gaming system comprising:

a gaming machine including a gaming cabinet, an electronic display device, and game-logic circuitry, the electronic display device configured to display a plurality of symbol-bearing reels and an array of symbol positions, the game-logic circuitry secured within a locked box inside the gaming cabinet, the game-logic circuitry including memory storing programming for a random number generator (RNG) and a wagering game that determines game outcomes the game-logic circuitry configured to perform the operations of:

prior to executing the wagering game, executing an authentication program to authenticate at least the RNG programming and the wagering-game programming that determines game outcomes, wherein executing the authentication program comprises generating a live authentication code derived from contents of the memory and comparing the live authentication code to a trusted code stored in the memory, and permitting execution of the RNG programming and the wagering-game programming only upon a match;

conducting a first spin including:

spinning and stopping the symbol-bearing reels using the RNG to randomly determine an outcome that controls the spinning and stopping of the symbol-bearing reels to land one or more first value-bearing symbols borne by the reels in the array; and animating the array on the electronic display device to tag the symbol positions in which the first value-bearing symbols land; and conducting a second spin subsequent to the first spin, the second spin including:

again spinning and stopping the symbol-bearing reels using the RNG to randomly determine an outcome that controls the spinning and stopping of the symbol-bearing reels to land (i) a second value-bearing symbol borne by the reels in one of the tagged symbol positions, and (ii) a third value-bearing symbol borne by the reels in another one of the tagged symbol positions that is in a cluster with the one of the tagged symbol positions;

animating the array on the electronic display device to display (1) a first value borne by the second value-bearing symbol in the one of the tagged symbol positions, (ii) a second value borne by the third value-bearing symbol in the another one of the tagged symbol positions, and (iii) a third value derived from the first and second values in any other ones of the tagged symbol positions in the cluster;

presenting on the electronic display device, an award based on the first, second, and third values; and animating the array on the electronic display device to untag the tagged symbol positions in the cluster.

8. The gaming system of claim 7, wherein the operation of animating the array to tag the symbol positions in which the first value-bearing symbols land includes applying a border, color change, background change, watermark, or other distinguishing characteristic to the symbol positions.

9. The gaming system of claim 7, wherein the third value is equal to the sum of the first and second values.

10. The gaming system of claim 7, wherein the tagged symbol positions in the cluster are adjacent to each other such that each tagged symbol position in the cluster is adjacent to at least one other tagged symbol position in the cluster.

11. The gaming system of claim 7, wherein the gaming machine includes a value input device and one or more electronic input devices, and wherein the game-logic circuitry is further configured to perform the operations of:

detecting, via the value input device, a physical item associated with a monetary value that establishes a credit balance; and receiving, via at least one of the one or more electronic input devices, a cash out input that initiates a payout from the credit balance.

12. The gaming system of claim 11, wherein the game-logic circuitry is further configured to perform the operation of:

receiving, via at least one of the one or more electronic input devices, a wager input that initiates the first spin.

13. A gaming system comprising:

a gaming machine including a gaming cabinet, an electronic display device, and game-logic circuitry, the electronic display device configured to display a plurality of symbol-bearing reels and an array of symbol positions, the game-logic circuitry secured within a locked box inside the gaming cabinet, the game-logic circuitry including memory storing programming for a random number generator (RNG) and a wagering game that determines game outcomes the game-logic circuitry configured to perform the operations of:

prior to executing the wagering game, executing an authentication program to authenticate at least the RNG programming and the wagering-game programming that determines game outcomes, wherein executing the authentication program comprises generating a live authentication code derived from contents of the memory and comparing the live authentication code to a trusted code stored in the memory, and permitting execution of the RNG programming and the wagering-game programming only upon a match;

conducting a first spin including:

spinning and stopping the symbol-bearing reels using the RNG to randomly determine an outcome that controls the spinning and stopping of the symbol-bearing reels to land one or more first value-bearing symbols borne by the reels in the array; and animating the array on the electronic display device to tag the symbol positions in which the first value-bearing symbols land; and conducting a second spin subsequent to the first spin, the second spin including:

again spinning and stopping the symbol-bearing reels using the RNG to randomly determine an outcome that controls the spinning and stopping of the symbol-bearing reels to land (i) a second value-bearing symbol borne by the reels in one of the tagged symbol positions, and (ii) a third value-bearing symbol borne by the reels in a symbol position other than any of the tagged symbol positions;

animating the array on the electronic display device to display a value borne by the second value-bearing symbol in the one of the tagged symbol positions and any other ones of the tagged symbol positions in a cluster with the one of the tagged symbol positions;

presenting, on the electronic display device, an award based on the values displayed in the one of the tagged symbol positions and any other ones of the tagged symbol positions in the cluster;

animating the array on the electronic display device to untag the one of the tagged symbol positions and any other ones of the tagged symbol positions in the cluster; and animating the array on the electronic display device to tag the symbol position in which the third value-bearing symbol landed.

14. The gaming system of claim 13, wherein the operation of animating the array to tag the symbol positions in which the first value-bearing symbols land includes applying a border, color change, background change, watermark, or other distinguishing characteristic to the symbol positions.

15. The gaming system of claim 14, wherein the operation of animating the array to tag the symbol position in which the third value-bearing symbol landed includes applying a border, color change, background change, watermark, or other distinguishing characteristic to the symbol position.

16. The gaming system of claim 13, wherein the tagged symbol positions in the cluster are adjacent to each other such that each tagged symbol position in the cluster is adjacent to at least one other tagged symbol position in the cluster.

17. The gaming system of claim 13, further comprising the operations of:

detecting, via a value input device, a physical item associated with a monetary value that establishes a credit balance; and receiving, via at least one of one or more electronic input devices, a cash out input that initiates a payout from the credit balance.

18. The gaming system of claim 17, further comprising the operation of:

receiving, via at least one of the one or more electronic input devices, a wager input that initiates the first spin.

* * * * *